US008942245B2

(12) United States Patent
Aybay et al.

(10) Patent No.: US 8,942,245 B2
(45) Date of Patent: Jan. 27, 2015

(54) METHODS AND APPARATUS FOR CENTRALIZED VIRTUAL SWITCH FABRIC CONTROL

(75) Inventors: Gunes Aybay, Los Altos, CA (US); Pradeep Sindhu, Los Altos Hills, CA (US); Anjan Venkatramani, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 321 days.

(21) Appl. No.: 12/951,706

(22) Filed: Nov. 22, 2010

(65) Prior Publication Data

US 2012/0128004 A1    May 24, 2012

(51) Int. Cl.
*H04L 12/56* (2011.01)
*G06F 13/40* (2006.01)
*H04L 12/28* (2006.01)
*H04L 12/24* (2006.01)

(52) U.S. Cl.
CPC ............ *G06F 13/4022* (2013.01); *H04L 12/28* (2013.01); *H04L 41/082* (2013.01); *G06F 2213/0058* (2013.01)
USPC ........................... 370/401; 370/392; 709/232

(58) Field of Classification Search
CPC ...................................................... H04L 12/28
USPC .................................. 370/392, 401; 709/232
See application file for complete search history.

(56) References Cited

U.S. PATENT DOCUMENTS

| 6,609,153 | B1 | 8/2003 | Salkewicz |
| 7,860,097 | B1* | 12/2010 | Lovett et al. ................. 370/392 |
| 8,175,079 | B2* | 5/2012 | Alapuranen et al. .......... 370/351 |
| 2006/0005185 | A1 | 1/2006 | Nguyen |
| 2007/0036178 | A1 | 2/2007 | Hares et al. |
| 2007/0136489 | A1* | 6/2007 | Temoshenko et al. ........ 709/237 |
| 2008/0126788 | A1* | 5/2008 | Kreek et al. .................. 713/100 |
| 2008/0186875 | A1 | 8/2008 | Kitani |
| 2009/0328024 | A1* | 12/2009 | Li et al. ......................... 717/169 |
| 2011/0161468 | A1* | 6/2011 | Tuckey et al. ................. 709/220 |

FOREIGN PATENT DOCUMENTS

CN          1981268          6/2007

OTHER PUBLICATIONS

Extended Search Report for European Application No. 11174003.1, mailed Feb. 8, 2012.
Chinese Office Action for Chinese Application No. 201110212393.9 mailed Jan. 6, 2014 and English translation thereof.
Chinese Office Action for Chinese Application No. 201110212393.9 mailed Sep. 16, 2014 and English translation thereof.

* cited by examiner

*Primary Examiner* — Dang Ton
*Assistant Examiner* — Mewale Ambaye
(74) *Attorney, Agent, or Firm* — Cooley LLP

(57) ABSTRACT

In some embodiments, an apparatus comprises a processing module, disposed within a first switch fabric element, configured to detect a second switch fabric element having a routing module when the second switch fabric element is operatively coupled to the first switch fabric element. The processing module is configured to define a virtual processing module configured to be operatively coupled to the second switch fabric element. The virtual processing module is configured to receive a request from the second switch fabric element for forwarding information and the virtual processing module is configured to send the forwarding information to the routing module.

18 Claims, 4 Drawing Sheets

METHODS AND APPARATUS FOR CENTRALIZED VIRTUAL SWITCH FABRIC CONTROL

BACKGROUND

Some embodiments described herein relate generally to switch fabric control, and, in particular, to centralized virtual control associated with switch fabrics.

A switch fabric can include a large quantity of switches to direct data packets from a source device to a destination device. Switches within the switch fabric can each include a local processor and receive periodic software updates. As a switch fabric grows larger, more switches are included, resulting in increased power usage from the added processors and a longer, labor-intensive, and potentially error prone, software upgrade process. In some instances, a network operator manages a software upgrade for each individual switch and often manually upgrades the software one switch at a time.

Thus, a need exists for methods and apparatus to simplify the software upgrade process of a switch fabric and to reduce the power usage of a switch fabric.

SUMMARY

In some embodiments, an apparatus comprises a processing module, disposed within a first switch fabric element, configured to detect a second switch fabric element having a routing module when the second switch fabric element is operatively coupled to the first switch fabric element. The processing module is configured to define a virtual processing module configured to be operatively coupled to the second switch fabric element. The virtual processing module is configured to receive a request from the second switch fabric element for forwarding information and the virtual processing module is configured to send the forwarding information to the routing module.

DETAILED DESCRIPTION

Figure 1:
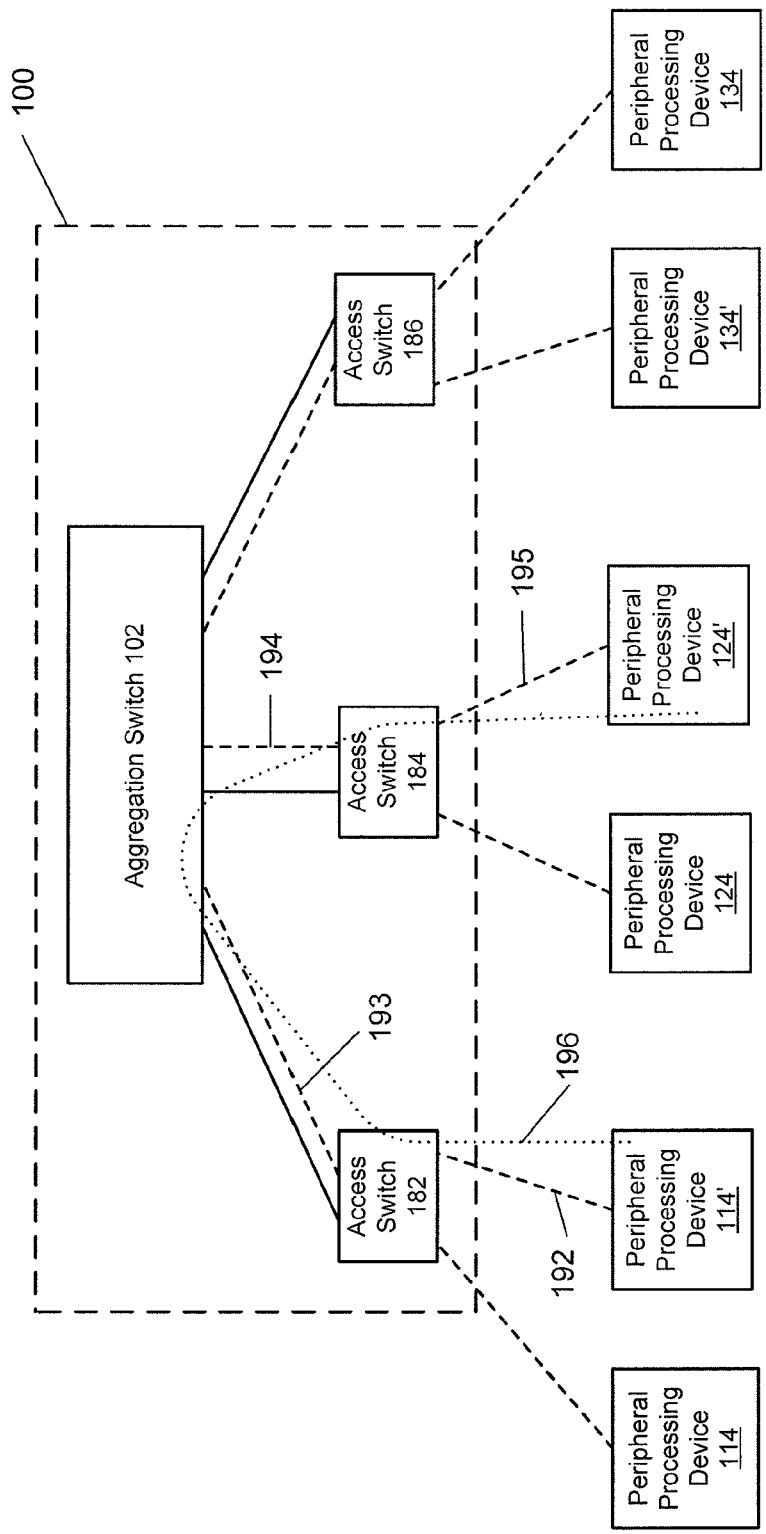
FIG. 1 is a system block diagram of a switch fabric system, according to an embodiment.

In some embodiments, an apparatus comprises a processing module, disposed within a first switch fabric element, configured to detect a second switch fabric element having a routing module when the second switch fabric element is operatively coupled to the first switch fabric element. The processing module is configured to define a virtual processing module configured to be operatively coupled to the second switch fabric element. The virtual processing module is configured to receive a request from the second switch fabric element for forwarding information and the virtual processing module is configured to send the forwarding information to the routing module.

In some embodiments, an apparatus comprises a processing module, having a first software configuration and being disposed with a first switch fabric element, configured to detect a second switch fabric element. The processing module is configured to, at a first time, operatively couple a virtual processing module, configured based on the first software configuration and being disposed within the first switch fabric element, to the second switch fabric element. The processing module is configured to receive a configuration file to configure the processing module based on a second software configuration at a second time after the first time and the processing module is configured to configure the virtual processing module based on the second software configuration.

In some embodiments, a non-transitory processor-readable medium storing code represents instructions to cause a processor to detect a first switch fabric element having a routing module and define a virtual processing module operatively coupled to the first switch fabric element. The virtual processing module is configured to receive a request from the first switch fabric element for forwarding information and the virtual processing module is configured to send the forwarding information to the routing module in response to receiving the request.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules and/or devices are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, and/or the like.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system, according to an embodiment. The switch fabric 100 can include a switch fabric element(s), such as, for example, an aggregation switch and/or an access switch. The switch fabric 100 includes an aggregation switch 102 and multiple access switches 182, 184, 186. The switch fabric 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the access switches 182, 184, 186, respectively, of the switch fabric 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric 100 via the access switches 182, 184, 186, respectively. In some embodiments, each connection between the peripheral processing devices 114, 124, 134 and the access switches 182, 184, 186, respectively, is a direct link. Such a link can be said to be a single physical hop link. In other embodiments, the peripheral processing devices can be operatively coupled to the access switches via intermediate modules. Such a connection can be said to be a multiple physical hop link.

Each access switch 182, 184, 186 can be any device configured to operatively couple peripheral processing devices 114, 124, 134 to the aggregation switch 102. In some embodiments, for example, the access switches 182, 184, 186 can be access switches, input/output modules, top-of-rack devices and/or the like. Structurally, the access switches 182, 184, 186 can function as both source access switches and destination access switches. Accordingly, the access switches 182, 184, 186 can send data (e.g., a data stream of data packets and/or data cells) to and receive data from the aggregation switch 102, and to and from the connected peripheral processing devices 114, 124, 134.

In some embodiments, the access switches 182, 184, 186 can be a combination of hardware modules and software modules (executing in hardware). In some embodiments, for example, each access switch 182, 184, 186 can include a field-programmable gate array (FPGA), an application specific integrated circuit (ASIC), a digital signal processor (DSP) and/or the like.

The access switches 182, 184, 186 can be configured to prepare a data packet (e.g., an Ethernet packet) to enter the aggregation switch 102. For example, the access switches 182, 184, 186 can be configured to forward, classify, and/or modify the packet (e.g., modify, add and/or remove a header portion, footer portion and/or any other identifier included within the data packet) prior to sending the data packet to the aggregation switch 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the access switches 182, 184, 186 is configured to communicate with the other access switches 182, 184, 186 via the aggregation switch 102. Specifically, the aggregation switch 102 is configured to provide connectivity between the access switches 182, 184, 186 at relatively low latency. For example, aggregation switch 102 can be configured to transmit (e.g., convey) data between access switches 182, 184, 186. In some embodiments, the aggregation switch 102 can have several ports (e.g., egress ports and/or ingress ports) through which access switches 182, 184, 186 can transmit and/or receive data.

The access switches 182, 184, 186 can include one or more network interface devices (e.g., a 40 Gigabit (Gb) Ethernet interface, a 100 Gb Ethernet interface, etc.) through which the access switches 182, 184, 186 can send signals to and/or receive signals from the aggregation switch 102. The signals can be sent to and/or received from the aggregation switch 102 via an electrical link, an optical link and/or a wireless link operatively coupled to the access switches 182, 184, 186. In some embodiments, the access switches 182, 184, 186 can be configured to send signals to and/or receive signals from the aggregation switch 102 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The aggregation switch 102 can be any suitable switch fabric that operatively couples the access switches 182, 184, 186 to the other access switches 182, 184, 186. In some embodiments, for example, the aggregation switch 102 can be a Clos network (e.g., a non-blocking Clos network, a strict sense non-blocking Clos network, a Benes network) having multiple stages of switching modules (e.g., integrated Ethernet switches). In some embodiments, for example, the aggregation switch 102 can be similar to the three-stage switch fabric. In other embodiments, the aggregation switch 102 shown in FIG. 1 can include a different number of stages. In such embodiments, for example, the aggregation switch 102 can include five, seven or nine stages. The aggregation switch 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the aggregation switch 102 can be (e.g., can function as) a single consolidated switch (e.g., a single large-scale consolidated L2/L3 switch). In other words, the aggregation switch 102 can be configured to operate as a single logical entity (e.g., a single logical network element). Similarly stated, the aggregation switch 102 can be part of a single logical hop between a first access switch 182, 184, 186 and a second access switch 182, 184, 186 (e.g., along with the data paths between the access switches 182, 184, 186 and the aggregation switch 102). The aggregation switch 102 can be configured to connect (e.g., facilitate communication between) the peripheral processing devices 114, 124, 134. In some embodiments, the aggregation switch 102 can be configured to communicate via interface devices (not shown) configured to transmit data at a rate of at least 10 Gb/s. In some embodiments, the aggregation switch 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the aggregation switch 102 can be logically centralized, the implementation of the aggregation switch 102 can be highly distributed, for example, for reliability. For example, portions of the aggregation switch 102 can be physically distributed across, for example, many chassis. In some embodiments, for example, a processing stage of the aggregation switch 102 can be included in a first chassis and another processing stage of the aggregation switch 102 can be included in a second chassis. Both of the processing stages can logically function as part of a single consolidated switch (e.g., within the same logical hop) but have a separate single physical hop between respective pairs of processing stages. More details related to architecture of the aggregation switch 102 are described herein.

In use, a data packet (e.g., an Ethernet packet) can be sent between peripheral processing devices 114, 124, 134 via the switch fabric 100. For example, a data packet can be sent from a first peripheral processing device 114' to a second peripheral processing device 124' via path 196. The first peripheral processing device 124' can send the data packet to the access switch 182 via link 192. The access switch 182 can then prepare the data packet to enter the aggregation switch 102.

Once prepared, the access switch 182 sends the data packet to the aggregation switch 102 via link 193. The switching modules within the aggregation switch 102 can route the data packets through the aggregation switch 102. The data packet is sent through a port to the access switch 184 via link 194. The access switch 184 can then send the data packet to the second peripheral processing device 124' via link 195 using the first protocol.

Figure 2:
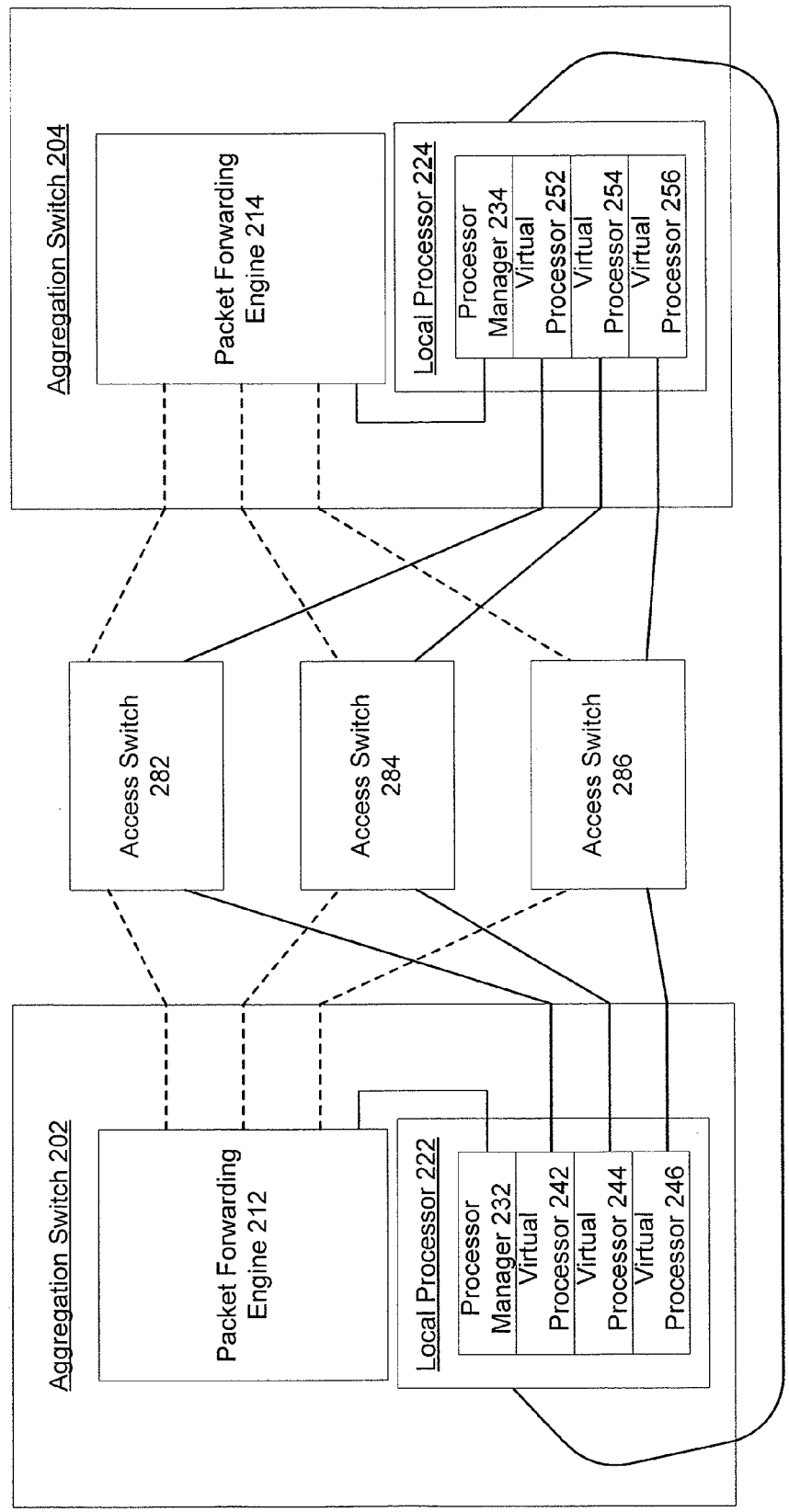
FIG. 2 is a schematic illustration of a switch fabric, according to another embodiment.

FIG. 2 is a schematic diagram that illustrates a switch fabric 200, according to an embodiment. The switch fabric 200 can be similar to switch fabric 100 and can include similar components, with similar functionality, as switch fabric 100. Switch fabric 200 includes an aggregation switch 202, and aggregation switch 204, and multiple access switches 282, 284, 286. Aggregation switches 202, 204 can be similar to aggregation switch 102 of switch fabric 100, and access switches 282, 284, 286 can be similar to access switches 182, 184, 186 of switch fabric 100.

Aggregation switch 202 includes a packet forwarding engine ("PFE") 212 and a local processor 222. Packet forwarding engine 212 can include, for example, application-specific integrated circuits (ASIC), field programmable gate array (FPGA), digital signal processor (DSP), etc, and can perform switching, e.g., layer 2 and layer 3 data packet switching, route lookups, and packet forwarding. In some embodiments, the packet forwarding engine can be integral with the local processor (see e.g., FIG. 3). Local processor 222 includes a processor manager 232 operatively coupled to packet forwarding engine 212. The processor manager 232 is configured to control aggregation switch 202 within the control plane, and to manage any virtual local processors virtual local processor defined by local processor 222 as described herein. For example, local processor 222 can define virtual local processors 242, 244, 246. Each of virtual local processors 242, 244, 246 is operatively coupled to one of access switches 282, 284, 286, and is configured to send control signals to and receive requests from its associated access switch to manage the forwarding of data through switch fabric 200. By way of example, virtual local processor 246 is operatively coupled to access switch 286 and can receive requests for information and/or instructions, such as data packet forwarding information, from access switch 286, and can send information, data, commands, and/or instructions to access switch 286.

Aggregation switch 204, can be similar to aggregation switch 202, and can include a packet forwarding engine 214 and an LCPU 224. Packet forwarding engine 214 can include application-specific integrated circuits (ASIC), field programmable gate array (FPGA), digital signal processor (DSP), etc, and can perform switching, e.g., layer 2 and layer 3 data packet switching, route lookups, and packet forwarding. LCPU includes a processor manager 234 operatively coupled to packet forwarding engine 214. The processor manager 234 is configured to control aggregation switch 204 within the control plane, and to manage any virtual local processors defined by local processor 224 as described herein. For example, local processor 224 can define virtual local processors 242, 244, 246. Each of virtual local processors 242, 244, 246 is operatively coupled to one of access switches 282, 284, 286, and is configured to send control signals to and receive request from an associated access switch to manage the forwarding of data through switch fabric 200. By way of example, virtual local processor 256 is operatively coupled to access switch 286 and can receive requests for information and/or instructions, such as data packet forwarding information, from access switch 286, and can send information, data, commands, and/or instructions to access switch 286.

As depicted in FIG. 2, aggregation switch 202 and aggregation switch 204 can be operatively coupled to each other, and each access switch 282, 284, 286 can be operatively coupled to both aggregation switch 202 and aggregation switch 204. In this manner, a virtual local processor from one of aggregation switches 202, 204 can define the primary, or master, virtual local processor for an access switch and the other of aggregation switches 202, 204 can define the secondary, or back-up, virtual local processor for that access switch. By way of example, virtual local processor 242 can be the master virtual local processor for access switch 282, and virtual local processor 252 can be the back-up virtual local processor for access switch 282. In this manner, if either the back-up virtual local processor or master virtual local processor fails, becomes corrupted, or otherwise becomes non-operational, the remaining virtual local processor 242, 252 can operate and each of access switches 282, 284, 286 can continue to operate. Similarly, if either aggregation switch 202, 204 fails, becomes corrupted, or otherwise becomes non-operational, the remaining aggregation switch 202, 204, including its virtual processors, 242-246 or 252-256 can continue to operate. In some embodiments, aggregation switch 202 defines all of the master virtual local processors and aggregation switch 204 defines all of the back-up virtual local processors. In some embodiments, each of aggregation switches 202, 204 define a mix of master virtual local processors and back-up virtual local processors. While FIG. 2 depicts switch fabric 200 as including two aggregation switches and three access switches, in some embodiments switch fabric 200 can include more or fewer aggregation switches and/or access switches. In some embodiments, the distribution of master and back-up virtual local processors is not symmetric amongst pairs of aggregations switches. In these embodiments, an aggregation switch other than aggregation switch 202, 204 can define the master and/or back-up virtual local processor for any one of access switches 282, 284, 286.

Figure 3:
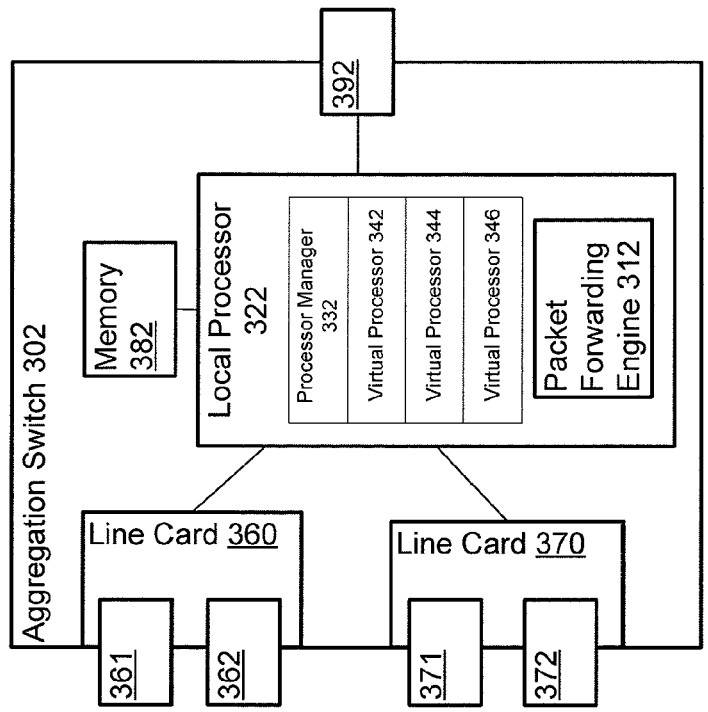
FIG. 3 is a schematic illustration of an aggregation switch of a switch fabric system, according to another embodiment.

FIG. 3 is a system block diagram of an aggregation switch 302 similar to aggregation switches 202, 204 of switch fabric 200, and aggregation switch 102 of switch fabric 100. The aggregation switch 302 includes an local processor 322, memory 382, line card 360, line card 370, and port 392. Local processor 322 is operatively coupled to memory 382, line card 360, line card 370 and port 392. Line card 360 includes ports 361 and 362. Line card 370 includes ports 371 and 372. In some embodiments, line cards 360 and/or 370 include one or more processors and/or memories.

Ports 361, 362, 371 and 372 can communicate with access switches. For example, ports 361, 362, 371 and 372 can implement a physical layer using twisted-pair electrical signaling via electrical cables or fiber-optic signaling via fiber-optic cables. In some embodiments, some of ports 361, 362, 371 and 372 implement one physical layer such as twisted-pair electrical signaling and others of ports 361, 362, 371 and 372 implement a different physical layer such as fiber-optic signaling. Furthermore, ports 361, 362, 371 and 372 can allow aggregation switch 302 to communicate with access switches via a common protocol such as Ethernet or Fibre Channel. In some embodiments, some of ports 361, 362, 371 and 372 implement one protocol such as Ethernet and others of ports 361, 362, 371 and 372 implement a different protocol such as Fibre Channel. Thus, aggregation switch 302 can be in communication with multiple access switches using homogeneous or heterogeneous physical layers and/or protocols via ports 361, 362, 371 and 372.

Port 392 can be in communication with other aggregation switches via a communications network such as a switch fabric. Port 392 can be part of one or more network interfaces (e.g., a 40 Gigabit (Gb) Ethernet interface, a 100 Gb Ethernet interface, etc.) through which the aggregation switch 302 can send signals to and/or receive signals from a communications network. The signals can be sent to and/or received from the communications network via an electrical link, an optical link and/or a wireless link operatively coupled to the aggregation switch 302. In some embodiments, the aggregation switch 302 can send signals to and/or receive signals from the communications network based on one or more protocols (e.g., an Ethernet protocol, a multi-protocol label switching (MPLS) protocol, a Fibre Channel protocol, a Fibre-Channel-over-Ethernet protocol, an Infiniband-related protocol).

In some embodiments, port 392 can implement a different physical layer and/or protocol than those implemented at ports 361, 362, 371 and 372. For example, port 361, 362, 371 and 372 can communicate with access switches using a protocol based on data packets and port 392 can communicate via a switch fabric using a protocol based on data cells. Said differently, aggregation switch 302 can be an edge device of a network switch (or switch core) such as a distributed network switch (or a distributed switch cone).

In some embodiments, the aggregation switch 302 can prepare a data packet (e.g., an Ethernet packet) to enter a communications network. For example, the aggregation switch 302 can forward, classify, and/or modify the packet encapsulation (e.g., modify, add and/or remove a header portion, footer portion and/or any other identifier included within the data packet) of a data packet prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Memory 382 of aggregation switch 302 can store a variety of software configuration files and/or data usable to define, assist with and/or expand the functionality or configuration of the aggregation switch 302. Such software configuration files and/or data can include operating system software configuration files, routing or look-up tables, etc. Each software configuration file can periodically be updated to insure that aggregation switch 302 includes the most recent and/or chosen configuration. Each virtual local processor defined by local processor 322 can be defined based on the current software configuration of the local processor 322. For example, local processor 322 can define virtual local processors 342, 344, 346. Each of virtual local processors 342, 344, 346 can be managed by processor manager 332. Each virtual local processor 342, 344, 346 can be operatively coupled to the memory 382 of aggregation switch 302 via local processor 322. Each virtual local processor 342, 344, 346 can be operatively coupled to the memory of the access switch operatively coupled to the virtual local processor 342, 344, 346, and can store software configuration files received from local processor 322 in the memory of the access switch. In some embodiments, aggregation switch 302 can be configured to receive new, or updated, software configuration files. In these embodiments, aggregation switch 302 can receive the updated software configuration file remotely, (e.g., via a communication network) and/or locally. Local processor 322 can be configured to automatically redefine any virtual local processor 342, 344, 346 defined by local processor 322 based on the updated software configuration. Said another way, any virtual local processor 342, 344, 346 defined by local processor 322 can include substantially the same software configurations as local processor 322 in software configuration and in functionality. In this manner, a virtual local processor 342, 344, 346 defined by local processor 322 can act as, and replace, a physical local processor to control the access switch within the control plane, on an access switch.

By way of example, aggregation switch 302 can include operating system software configuration file having a first operating software configuration and local processor 322 can manage or otherwise control aggregation switch 302 within the control plane, in accordance with the first configuration of the operating system software. Aggregation switch 302 can initially define a virtual local processor 342, 344, 346 having the first operating system configuration, and can later receive a second operating system configuration file. Local processor 302 can then redefine the virtual local processor 342, 344, 346 based on the second operating system configuration. In some embodiments, updating a software configuration of local processor 322 automatically redefines the software configuration any virtual local processor 342, 344, 346 defined by local processor 322. In some embodiments, updating a software configuration of local processor 322 prompts a user or communications network administrator to update the software configuration of the virtual local processors 342, 344, 346.

Figure 4:
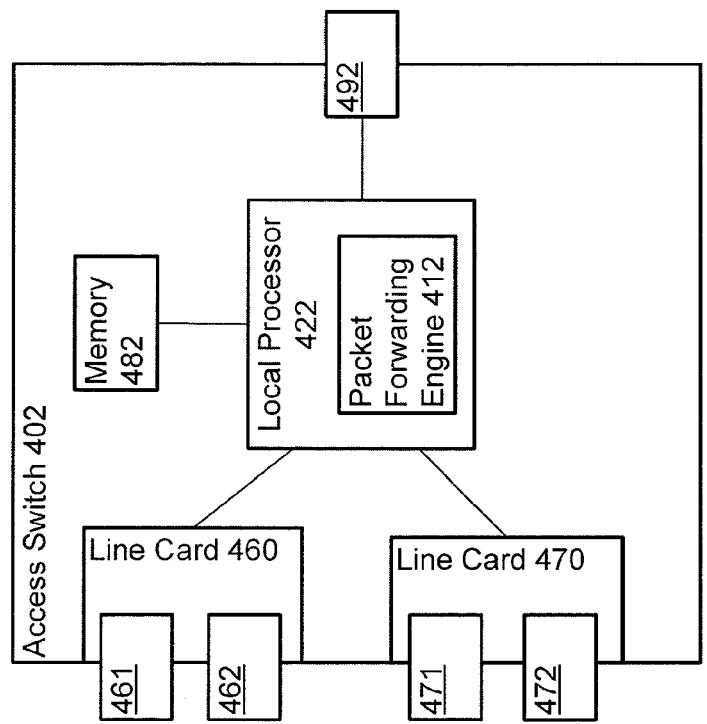
FIG. 4 is a schematic illustration of an access switch of a switch fabric system, according to another embodiment.

FIG. 4 is a system block diagram of an access switch 402 similar to access switches 182, 184, 188. The access switch 402 includes a memory 482, line card 460, line card 470, and port 492. A virtual local processor (not shown in FIG. 4) defined by an aggregation switch can manage access switch 402 and can be operatively coupled to memory 482, line card 460, line card 470, and port 492. In some embodiments, access switch 402 can include an local processor. In these embodiments, a virtual local processor defined to operate access switch 402 can operate access switch 402 and the local processor of the access switch can be inactive. Line card 460 includes ports 461 and 462. Line card 470 includes ports 471 and 472. In some embodiments, line cards 460 and/or 470 include one or more processors and/or memories.

Ports 461, 462, 471 and 472 can communicate with aggregation switches and/or peripheral processing devices. For example, ports 461, 462, 471 and 472 can implement a physical layer using twisted-pair electrical signaling via electrical cables or fiber-optic signaling via fiber-optic cables. In some embodiments, some of ports 461, 462, 471 and 472 implement one physical layer such as twisted-pair electrical signaling and others of ports 461, 462, 471 and 472 implement a different physical layer such as fiber-optic signaling. Furthermore, ports 461, 462, 471 and 472 can allow access switch 402 to communicate with access switches, such as, for example, computer servers (servers), via a common protocol such as Ethernet or Fibre Channel. In some embodiments, some of ports 461, 462, 471 and 472 implement one protocol such as Ethernet and others of ports 461, 462, 471 and 472 implement a different protocol such as Fibre Channel. Thus, access switch 402 can be in communication with multiple peripheral processing devices using homogeneous or heterogeneous physical layers and/or protocols via ports 461, 462, 471 and 472.

Port 492 can be in communication with other access switches via a communications network such as a switch fabric (e.g., data plane portion of the switch fabric system). Port 492 can be part of one or more network interfaces (e.g., a 40 Gigabit (Gb) Ethernet interface, a 100 Gb Ethernet interface, etc.) through which the access switch 402 can send signals to and/or receive signals from a switch fabric system. The signals can be sent to and/or received from the switch fabric system via an electrical link, an optical link and/or a wireless link operatively coupled to the access switch 402. In some embodiments, the access switch 402 can send signals to and/or receive signals from the switch fabric system based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 492 can implement a different physical layer and/or protocol than those implemented at ports 461, 462, 471 and 472. For example, port 461, 462, 471 and 472 can communicate with peripheral processing devices using a protocol based on data packets and port 492 can communicate via remaining portions of the switch fabric system using a protocol based on data cells. Said differently, access switch 402 can be an edge device of the remaining portions of the network switch such as a distributed network switch.

In some embodiments, the access switch 402 can prepare a data packet (e.g., an Ethernet packet) to enter a communications network. For example, the access switch 402 can forward, classify, and/or modify the packet (e.g., modify, add and/or remove a header portion, footer portion and/or any other identifier included within the data packet) prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 5:
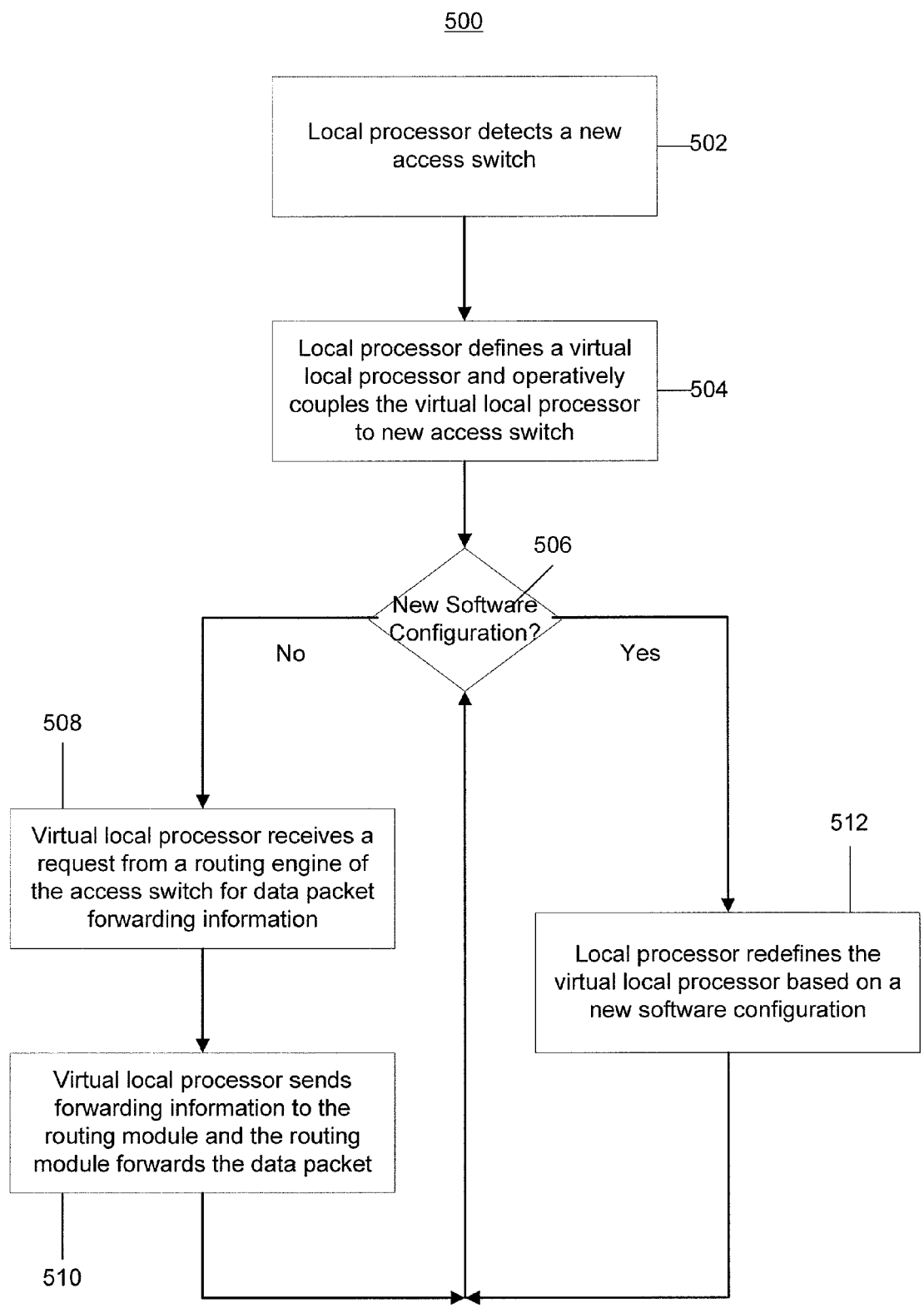
FIG. 5 is a flow chart illustrating a method of operating the switch fabric system, according to another embodiment.

FIG. 5 is a flow chart depicting a method 500 of operating switch fabric 200 as shown in FIG. 2, of an embodiment. A local processor of an aggregation switch having a first software configuration can detect that a new access switch has been operatively coupled to the aggregation switch, at 502. The local processor can define a new virtual local processor based on the first software configuration and can operatively couple the new virtual local processor to the new access switch, at 504. In some embodiments, the local processor can define a virtual local processor prior to detecting a new access switch. The local processor can determine whether a new, or updated, software configuration file has been received at the aggregation switch, at 506. Said another way, the local processor can determine whether the software configuration of the virtual local processor(s) is different from the software configuration of the local processor. If a new software configuration file (data, info) has not been received, the access switches and aggregation switches can continue to operate according to the existing configuration file (data, info), e.g. receive and forward data. Specifically, the PFE of the new access switch can receive a data packet and send a request to the virtual local processor for routing information. The virtual local processor can receive the request, at 508, and can send the requested information to the PFE and the PFE can forward the data based on routing information at 510. The local processor can periodically check for new software configuration files, at 506. If a new software configuration files is received, the local processor can redefine the virtual local processor based on the new software configuration, at 512.

In an example, and with reference to FIG. 2, switch fabric 200 can initially include aggregation switches 202, 204, PFEs 212, 214, local processors 222, 224, processor managers 232, 234, access switch 282, and virtual local processors 242, 252. Local processors 222, 224 can initially be based on the first software configuration. Access switch 284 can be operatively coupled to aggregation switch 202. Aggregation switch 202 can detect access switch 284 and can define virtual local processor 244 based on the first software configuration. Aggregation switch 202 can operatively couple access switch 284 to virtual local processor 244, and virtual local processor 244 can manage the control plane aspects of access switch 284. Access switch 284 can then receive data, request forwarding information from virtual local processor 244, and can forward data based on the forwarding information sent from virtual local processor 244. In some embodiments, access switch 284 can receive the data, and forward the data based on forwarding information stored within a memory of access switch 284 and received from virtual local processor 244. Local processor 222 can later receive a second configuration file and can redefine virtual local processor 242, 244 based on the second software configuration. In some embodiments, when a local processor receives a new, or updated, software configuration file, each virtual local processor 242, 252, 244 is automatically redefined based on the new (second) software configuration. In some embodiments, redefining the virtual local processor can include sending the new, or updated software configuration file to the memory of the access switch operatively coupled to the virtual local processor and causing the virtual local processor to install the new software configuration file at the access switch.

Further referencing and expanding the example, access switch 284 can be operatively coupled with aggregation switch 204 in addition to aggregation switch 202. Aggregation switch 204 can define virtual local processor 254 using the second software configuration in a manner similar to aggregation switch 202 defining virtual local processor 244, and can operatively couple virtual local processor 254 with access switch 284. Processor manager 232 of local processor 222 can communicate with processor manager 234 of local processor 224 to determine which of virtual local processors 244, 254 will be the master virtual local processor and which will the be the back-up virtual local processor for access switch 284. The master virtual local processor can be chosen based on any number of factors, including how many or few master virtual local processors a particular local processor is operating, the historic reliability of a particular local processor and/or aggregation switch, the age of an aggregation switch, or any other reason.

Further referencing and expanding the example, access switch 286 can then be operatively coupled to aggregation switch 202. Aggregation switch 202 can detect access switch 286 and can define virtual local processor 246 based on the second software configuration. Aggregation switch 202 can operatively couple access switch 286 to virtual local processor 246, and virtual local processor 246 can manage access switch 286. Access switch 286 can then receive data, request forwarding information from virtual local processor 246, and can forward data based on the forwarding information sent from virtual local processor 246. In some embodiments, access switch 286 can receive the data, and forward the data based on forwarding information stored within a memory of access switch 286 and received from the virtual local processor 246. Local processor 222, 224 can later receive a third software configuration file and can redefine virtual local processor 242, 244, 246, 252, 254 based on the third software configuration.

Further referencing and expanding the example, access switch 286 can be operatively coupled with aggregation switch 204 in addition to aggregation switch 202. Aggregation switch 204 can define virtual local processor 256 in a manner similar to aggregation switch 202 defining virtual local processor 246, and can operatively couple virtual local processor 256 with access switch 286. Processor manager 232 of local processor 222 can communicate with processor manager 234 of local processor 224 to determine which of virtual local processors 246, 256 will be the master virtual local processor and which will the be the back-up virtual local processor for access switch 286. The master virtual local processor can be chosen based on any number of factors, including how many or few master virtual local processors a particular local processor is operating, the historic reliability of a particular local processor and/or aggregation switch, the age of an aggregation switch, or any other reason.

While switch fabric 100 and switch fabric 200 are shown as including aggregation switches and access switches, in some embodiments, a switch fabric system can include one or more core switches, having similar components and functionality to aggregation switches. A core switch can operatively couple one or more aggregation switches together and can allow connectivity between the one or more aggregation switches and each of the aggregation switch's associated access switches and peripheral processing devices. In some embodiments, an local processor of a core switch can define one or more virtual local processors to manage one or more aggregation switches and/or access switches.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as routing, switching and/or forwarding a data packet through a switch fabric (e.g., switch fabric 200 of FIG. 2), in some embodiments access switches are configured to partition data packets into one or more data cells. In such embodiments, the data cells include a header (e.g., with a destination access switch identifier and a source access switch identifier) and can be routed, switched and/or forwarded through a switch fabric similar to that described herein with respect to data packets. A destination access switch can receive and reassemble the data cells to define the data packet. The data packet can then be sent to a destination peripheral processing device. In some embodiments, such data cells do not take a common path through the switch fabric. For example, some data cells defined from a data packet might pass through a first module associated with a second stage of the switch fabric while other data cells defined from the same data packet might pass through a second module associated with the second stage of the switch fabric. Moreover, in some embodiments, the data cells are equal in length and/or size.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth.

In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising: a processing module, configured based on a first software configuration and at a first time and disposed within a first switch fabric element, configured to detect a second switch fabric element having a routing module when the second switch fabric element is operatively coupled to the first switch fabric element, the processing module configured to define a virtual processing module locally within the processing module of the first switch fabric element, the virtual processing module configured to be operatively coupled to the second switch fabric element, the processing module is configured to receive a configuration file to configure the processing module based on a second software configuration at a second time, after the first time; and the virtual processing module configured based on a first software configuration and at a first time and configured to receive a request from the second switch fabric element for forwarding information, the virtual processing module configured to send the forwarding information to the routing module, the virtual processing module is configured based on the second software configuration at a third time, after the second time.

2. The apparatus of claim 1, wherein: the processing module is configured to receive a request from the first switch fabric element for forwarding information; and the processing module is configured to send the forwarding information to a routing module of the first switch fabric element in response to the request from the first switch fabric element.

3. The apparatus of claim 1, wherein the virtual processing module is configured to detect a third switch fabric element having a routing module, the processing module configured to define a second virtual processing module operatively coupled to the routing module of the third switch fabric element.

4. The apparatus of claim 1, wherein the first switch fabric element includes a routing module operatively coupled to the processing module and configured to receive data from the routing module of the second switch fabric element.

5. The apparatus of claim 1, wherein the virtual processing module is configured to receive the request when the second switch fabric element receives a data packet.

6. The apparatus of claim 1, wherein the virtual processing module is disposed within the first switch fabric element.

7. An apparatus, comprising: a processing module, having a first software configuration and being disposed with a first switch fabric element, configured to detect a second switch fabric element; the processing module configured to, at a first time, operatively couple a virtual processing module, configured based on the first software configuration and being disposed locally within the processing module of the first switch fabric element, to the second switch fabric element; the processing module configured to receive a configuration file to configure the processing module based on a second software configuration at a second time after the first time; and the processing module configured to configure the virtual processing module based on the second software configuration.

8. The apparatus of claim 7, wherein: the processing module is configured to detect a third switch fabric element; and the processing module is configured to, at a third time after the second time, operatively couple a virtual processing module, having the second software configuration and being disposed within the first switch fabric element, to the third switch fabric element.

9. The apparatus of claim 7, wherein the virtual processing module is configured to receive a request for forwarding information from a routing module disposed within the second switch fabric element.

10. The apparatus of claim 7, wherein the processing module is configured to detect the second switch fabric element when the second switch fabric element is operatively coupled to the first switch fabric element.

11. The apparatus of claim 7, wherein the virtual processing module is configured to send an instruction to a routing module disposed within the second switch fabric element to forward data received by the routing module to the first switch fabric element.

12. The apparatus of claim 7, wherein the processing module is configured to define the virtual processing module in response to detecting the first switch fabric element.

13. A non-transitory processor-readable medium storing code representing instructions to cause a processor to: detect a first switch fabric element having a routing module and a processor; and define locally within the processor, a virtual processing module operatively coupled to the first switch fabric element, the virtual processing module is configured to receive a request from the first switch fabric element for forwarding information, the virtual processing module is configured to send the forwarding information to the routing module in response to receiving the request; receive a first configuration file to configure a processing module based on a first software configuration at a first time; define the virtual processing module based on the first configuration file; receive a second configuration file configured to configure the processing module based on a second software configuration, different from the first software configuration, at a second time, after the first time; and define the virtual processing module based on the second software configuration after the second time.

14. The non-transitory processor-readable medium of claim 13, wherein the virtual processing module is disposed within a second switch fabric element.

15. The non-transitory processor-readable medium of claim 13, wherein the code representing instructions to cause the processor to define the virtual processing module includes code requesting instructions to cause the processor to define the virtual processing module in response to detecting the switch fabric.

16. The non-transitory processor-readable medium of claim 13, wherein the virtual processing module is configured to send an instruction to the routing module to forward data received by the routing module to a second switch fabric element.

17. The non-transitory processor-readable medium of claim 13, further storing code representing instructions to cause a processor to: detect a third switch fabric element; and operatively couple a second virtual processing module, having the second software configuration, to the third switch fabric element.

18. The non-transitory processor-readable medium of claim 13, wherein the virtual processing module is disposed separate from the first switch fabric element.

* * * * *